E. HOPKINSON.
METHOD AND APPARATUS FOR MANUFACTURING TIRES.
APPLICATION FILED APR. 28, 1921.
1,417,739.
Patented May 30, 1922.
4 SHEETS—SHEET 1.
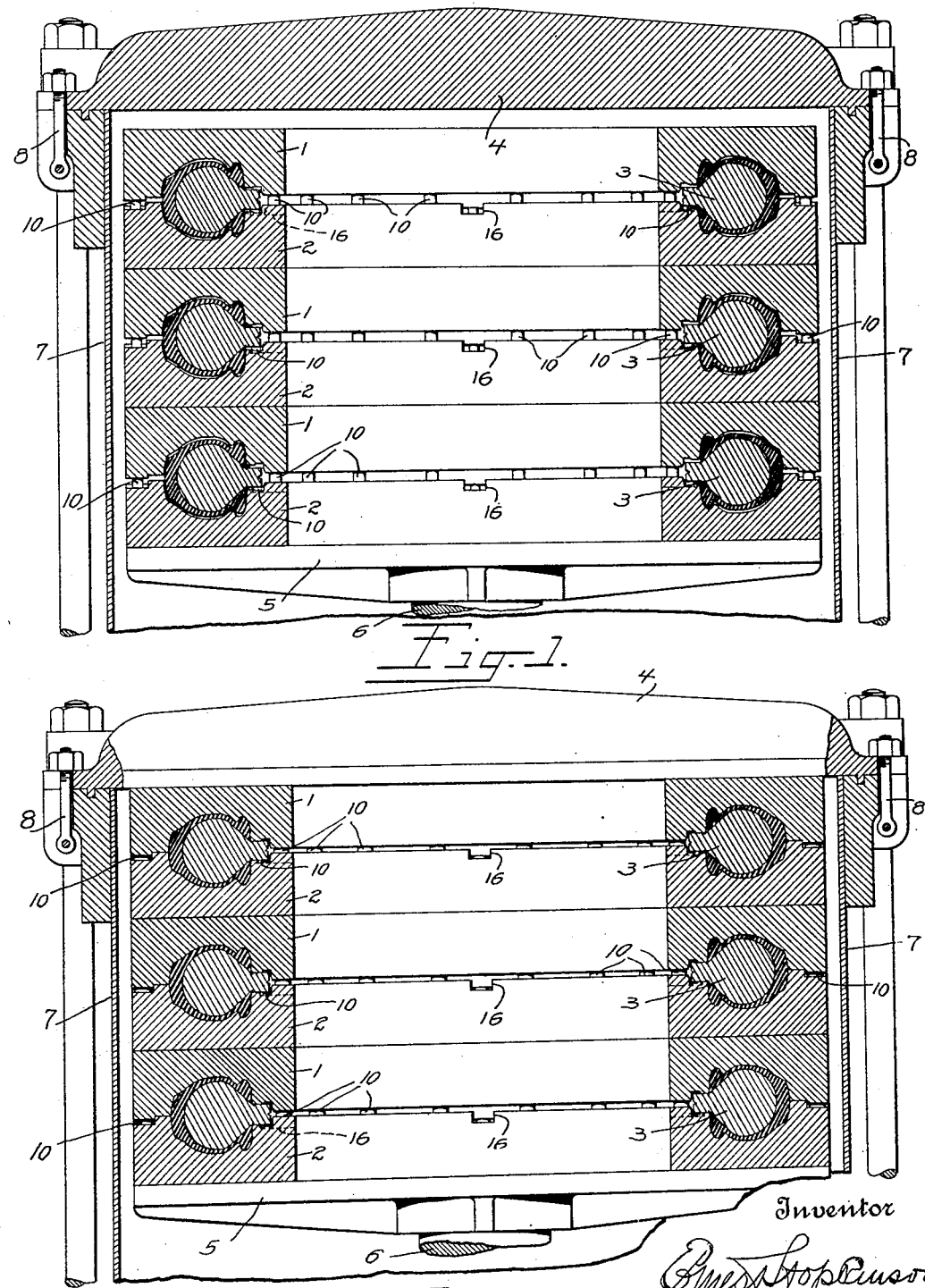

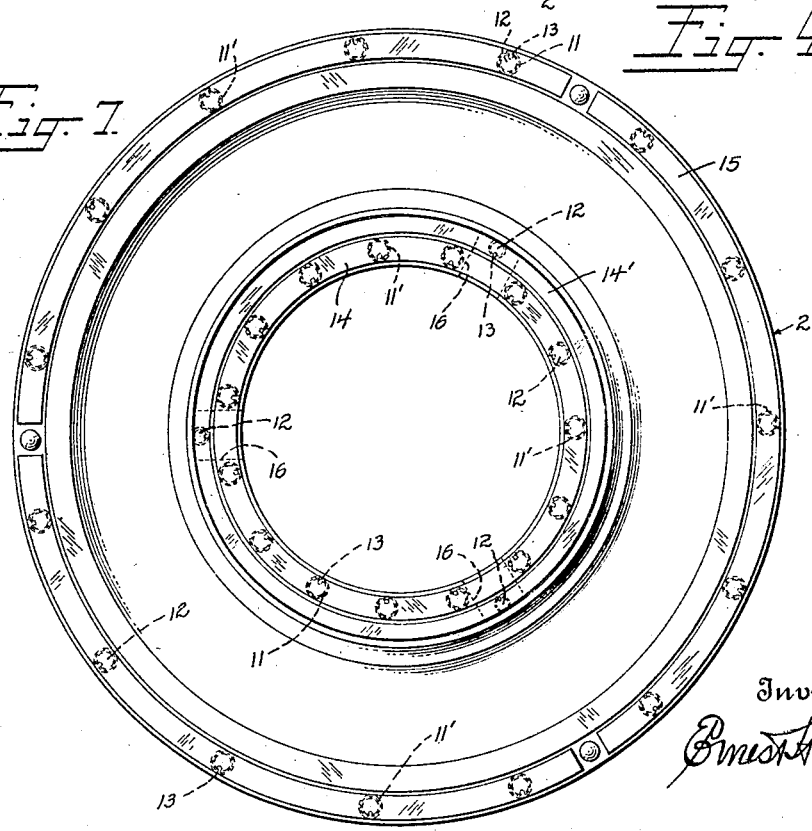

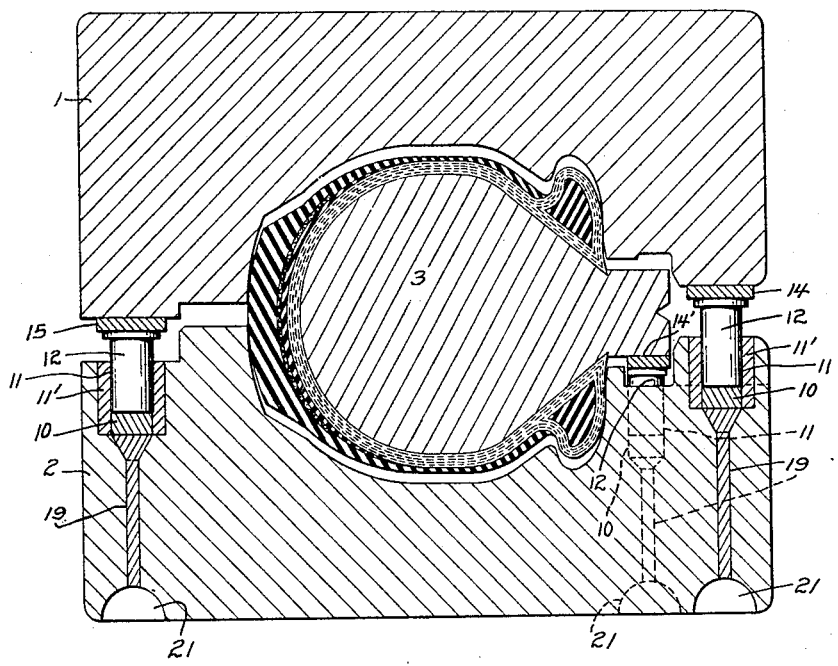
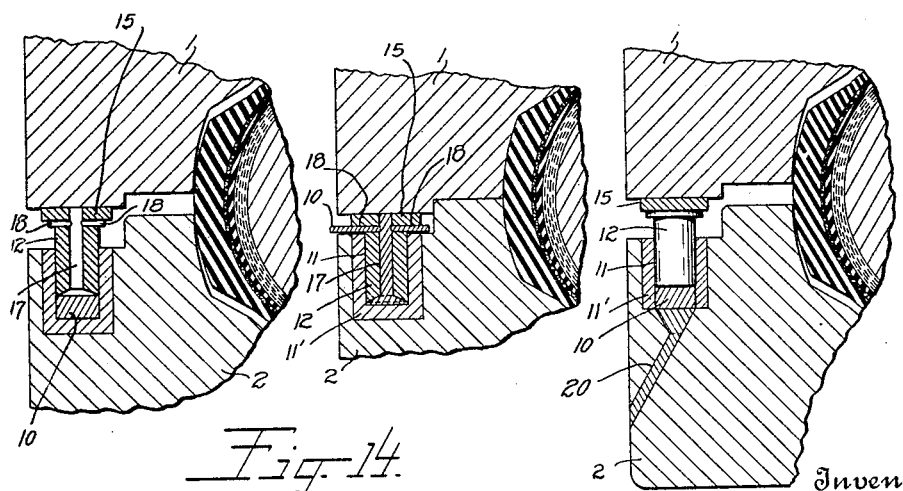

UNITED STATES PATENT OFFICE.

ERNEST HOPKINSON, OF NEW YORK, N. Y.

METHOD AND APPARATUS FOR MANUFACTURING TIRES.

1,417,739.   Specification of Letters Patent.   Patented May 30, 1922.

Application filed April 28, 1921. Serial No. 465,125.

*To all whom it may concern:*

Be it known that I, ERNEST HOPKINSON, a citizen of the United States, residing at New York, in the county of New York and State of New York, have invented a certain new and useful Method and Apparatus for Manufacturing Tires, of which the following is a full, clear, and exact description.

This invention relates in general to the manufacture of tires and in particular to a method and apparatus for curing tire casings in molds for a while without and finally with compacting pressure.

The absence of compacting pressure on the walls of the tire casings during the early stages of vulcanization seems to insure fixation in situ of the masses of rubber on and distributed, in the building of the carcass, around the strain resisting threads, cords or elements. By such fixation or set of the rubber, the subsequent pressure imposed during final cure of the tires is less likely to bring, or is wholly prevented from bringing, the strain resisting elements into chafing relation by displacement of the intervening rubber.

With the illustrated embodiments of the invention in mind, and without intention to limit its scope more than is required by the prior art, the invention consists in collapsibly supporting the sections of tire molds in spaced relation during a part of the curing treatment and subsequently closing the mold sections compactingly upon the tires while the cure is completed so that after the molds are initially stacked in a press or heater they need not be removed until the tires are completely cured.

Various embodiments of apparatus suitable for practicing this invention are illustrated in the accompanying drawings in which:—

Figure 8:
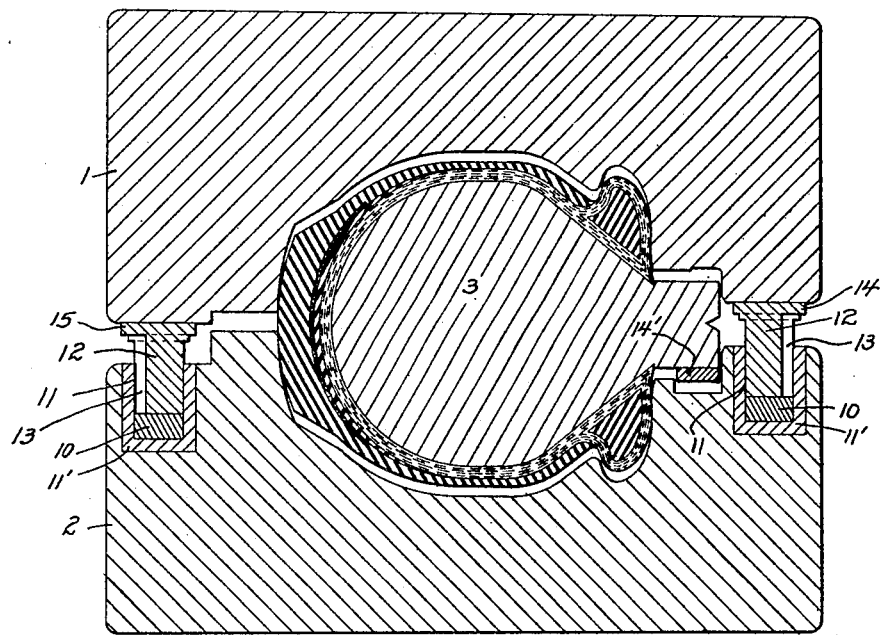
Figure 9:
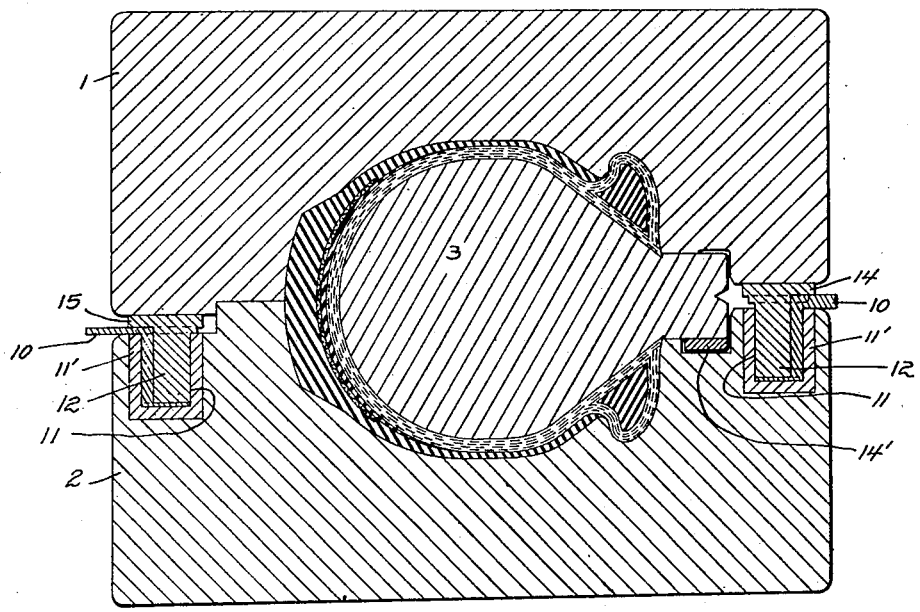

Figs. 1 and 2. are vertical sections through a stack of molds and an enclosing press type of vulcanizer showing the mold sections spaced and closed, respectively;

Figs. 3 and 4. are similar fragmentary sections showing the collapsible devices arranged adjacent the external periphery of the molds before and after closure, respectively;

Fig. 5. is a perspective of a suitable form of collapsible pellet or slug;

Figs. 6, 8 and 9. are cross sections of a loaded mold showing similar pistons and pellets for collapsibly supporting the mold sections and the core;

Fig. 7. is a plan view of a bottom mold section with the piston devices of Figs. 6, 8 and 9, in position ready for the introduction of the core and tire and mounting of the mating upper section;

Figs. 10 and 11. are fragmentary sections of a loaded mold showing another piston structure;

Figs. 12 and 13. are cross sections illustrating still other modifications of the invention, and;

Fig. 14. is a detail in side elevation of a convenient arrangement for locating the piston or plunger elements illustrated in Figs. 6 to 13, in registration with sockets in the molds.

In the drawings is illustrated conventionally a much used type of mold having upper and lower sections 1 and 2, respectively, which are shaped to impart the desired external configuration to the tire walls and to receive the inner periphery of the core 3, the latter in some cases being protruded more than is shown.

It is a prevailing practice, at least in final curing tires, to stack the molds in a French press type of heater having as shown in Figs. 1 and 2, an upper and fixed (or relatively fixed) platen 4 and a lower platen 5, movable hydraulically by a ram shown in section at 6. A jacket or shell 7 encloses the lower platen and is likewise also shiftable for facilitating the introduction and removal of the molds, its upper open end or mouth being adapted to be sealed against the upper platen and bolted thereto as indicated at 8.

According to my invention, the mold sections are held spaced apart either clear of the tire walls or in contact therewith but in any case without exerting a substantial compacting pressure. By temporarily holding the sections of the molds apart far enough to insure against exerting a substantial compacting pressure on them not only are their constituent masses of rubber set or relatively fixed in position where desired but the strain resisting elements are given an opportunity to adjust themselves to better advantage if not already so. To uniformly treat each tire in a batch of twenty or more that may be stacked in a press type of vulcanizer, as well as to entirely free them from any load during the early stages of vulcanization, means are positioned at intervals between their sections to hold them separated during the initial set or partial curing treatment in a heater. Ordinarily this is around twenty minutes but the period will vary with the composition of the rubber, the nature of the vulcanizing agent, and the presence or absence of accelerators. Temporary spacing of the molds may be done in various ways but preferably by positioning a collapsible material, such as lead, between the mold sections or the molds and the core, or both.

In Figs. 1 to 4, a simple arrangement of collapsible devices is disclosed. Therein are shown lead slugs or pellets 10, preferably of the cylindrical form shown in Fig. 5, capable of being squashed, mashed or extruded. They may be solid as shown, tubular or of any other suitable shape. The pellets 10 are positioned between the mold sections 1 and 2, at either or both their inner and outer peripheries, both preferably to insure against tilting of and unduly straining the sections of the molds. The tire and core rest in the bottom section in this form of the invention, and there will be only the negligible distributed weight of a single core on the lower side of each of the tires. The spaced position of the mold sections is shown in Figs. 1 and 3. The application of pressure to the ram carrying the lower platen will of course close the molds compactingly on the tires, the pellets or slugs 10 being mashed or spread by the tremendous pressure, around three hundred pounds to a square inch, that the ram may apply through the mold sections to the tire walls. The number and size of the pellets or slugs 10 may be varied as desired but of course they must be capable of bearing the superimposed load or dead weight.

In Figs. 6 and 7, a specifically different arrangement is disclosed. Here the leads 10, are positioned in sockets 11 under the lower end of steel pistons 12 that are cut away or grooved at one side as shown at 13. Preferably, but not necessarily, these pistons are mounted on or made integral with rings 14 and 14' or arcuate bands 15 clearing the usual dowel pins for convenience of registration with the sockets 11. In this modification, the core, as well as the mold sections, is shown collapsibly supported, but owing to the fact that the weight of only one core must be borne by the lead spacers 10, fewer need be employed. This is illustrated in Fig. 7 by the three pistons shown in dotted lines mounted on the lower side of the ring 14'. Opposite the grooves or channels 13, the mold sections may be cut away as indicated at 16 in Fig. 7, if clearance is necessary for the extruded metal which flows on applying pressure to the ram.

The modification illustrated in Figs. 8 and 9 is substantially identical with the form of invention shown in Fig. 6, with the exception that the sockets 11 are lined with steel as indicated at 11'.

If desired the pistons may be otherwise shaped to permit extrusion of the lead and closing of the sections. Central and transverse apertures indicated at 17 and 18, respectively, in Figs. 10 and 11, may be provided to allow the lead to flow upwardly and laterally through the piston. Or as shown in Figs. 12 and 13, the pistons may be perfectly cylindrical for the active portion of their length and the molds cut away or bored as indicated at 19 and 20, to permit the lead to be forced from beneath them into a cavity 21 provided in the bottom face of the lower mold section or out through one side of the mold.

The foregoing relates to a simple and comparatively inexpensive apparatus requiring little or no change in existing equipment and for these reasons preferred. But at the expense of more time and equipment, mechanical means such as, removable or retractable rollers or wedges, or suitably spaced collapsible lifting arms, may be utilized to temporarily hold the mold sections apart. Such or other equivalent alterations are comprehended within my broad invention. Lead is the preferred collapsible material but there are a variety of soft metals, too numerous to mention, having more or less compressive strength that might be used in lieu thereof.

According to my invention and however built, the tire is mounted on a core, if not already so, and introduced in a mold. A number of the molds, the more the greater the economy, are stacked in a heater with their sections held temporarily spaced apart sufficiently to relieve each of the tires of compacting pressure entirely or very nearly entirely. If lead pellets are used, they are positioned on the lower mold sections before or after introduction of the tires and assemblage of the mating upper mold sections. Or they may be inserted by spreading the sections after the molds have been loaded and assembled. If mechanical devices are employed, the spacing of the sections may be done before or after stacking a batch of molds in a heater.

The stack of molds with the sections held spaced apart, as variously prescribed above, are then subjected to a preliminary set-treatment for a suitable period of time to insure against displacement of the rubber masses from between and around the strain resisting elements by the subsequently imposed wall densifying pressures exerted during final curing. If a French press type of vulcanizer or heater is used, this is done by closing the jacket 7 against the head or upper platen 4 and supplying the heating medium but without lifting the ram. The heating medium may be of any suitable nature but steam is most economical and convenient and is generally used for curing purposes. The duration of the preliminary treatment may be varied, if desired, or to meet the requirements of the molds and the size and composition of the tires. If accelerators are employed in addition to the vulcanizing agents in the rubber composition, the duration of preliminary treatment may of course be shortened. At the present day with tried compounds, and by way of example, a treatment for about twenty minutes with steam at 35 or 40 lbs. pressure yields satisfactory results.

At the end of the preliminary treatment, at which the tires are ordinarily partially vulcanized and their threads or cords more or less fixed and embedded in masses of rubber under conditions approaching the ideal, compacting pressure of around 300 lbs. to the square inch is applied to the tire but this of course may be varied as the manufacturer sees fit. The compacting pressure may be applied readily by operation of the ram 6 if the molds have been stacked in a press type of heater. If lead or other collapsible material has been employed to hold the sections of each mold apart or spaced as previously prescribed, the interposed pellets or slugs 10 will be successively quashed or mashed as the ram rises, intermediate the lower mold sections first and then in sequence to the top mold sections. While applying a compacting pressure to the tires in the above manner, or in any other convenient fashion, the tires are completely cured. If steam at 35 or 40 lbs. pressure is used, this will extend over a period variable with the compound, thickness and curatives employed in the tires but ordinarily from 30 to 40 minutes in small sized tires and longer in larger sizes. At the end of this time, the tires being completely cured, the molds are taken out and emptied.

Between the partial and complete curing treatment, it may be desired to modify the procedure. Steam condenses on encountering objects at a lower temperature and water may collect in spots on the tire walls. If not gotten rid of, the finished tires may be blemished. If condensation of steam occurs to an intolerable extent at this stage of the process, it may be evaporated by suddenly reducing the steam pressure. This may be done variously as by throttling the steam down to say 10 pounds or shutting it off completely and venting or opening up the press to the atmosphere. The low pressure period should be the minimum necessary to effect evaporation without cooling the molds to a prohibitive degree, and preferably is initiated as soon as the molds reach a vulcanizing temperature, around say 286° F. Or condensation may be prevented or diminished by pre-heating the molds either before or after their introduction in the press or heating chamber. The pre-heating may be done with hot air or super-heated steam. The steam may be super-heated before it is supplied to the heating chamber or afterwards, in the latter case by internally arranged heating coils or radiators. And super-heated steam may be employed throughout the entire curing process as well as solely in the preliminary or partial curing treatment.

The elimination of the necessity of separately heating the tires to give them the set cure and of manuel operations necessarily attending such separate preliminary heat treatment, are obviously economical features of the present method. Further economy results from the saving in time. No alteration of the molds is required, at least in the simplest form of the invention.

In the foregoing the preferred method and apparatus are disclosed in detail. Various changes and adaptations may be made both in the construction and in the method of its use and for a full understanding of the scope of the invention, reference should be made to the accompanying claims.

Having thus described my invention, what I claim and desire to protect by Letters Patent is:

1. That method of curing tire casings in sectional molds, which includes, subjecting the casings to vulcanizing treatment at first with the sections of the molds held separated and thereafter with the sections of the molds closed and exerting a substantial compacting pressure on the casings.

2. That method of curing tire casings in sectional molds which includes, subjecting the casings to vulcanizing treatment while the sections of the molds are held apart, and subsequently applying a compacting pressure to the casings without shifting rubber from between the constituent strain resisting elements and completely curing the casings under such pressure.

3. That method of curing tire casings in sectional molds stacked in a press type of heater which includes, holding the sections of the several molds apart sufficiently to relieve the tire casings entirely of pressure therefrom while partially curing the casings, and subsequently clamping the sections of the molds together and curing the casings completely under a substantial densifying pressure.

4. That method of curing tire casings on cores and in molds in a press type of vulcanizer which includes, collapsibly supporting the sections of the molds in spaced relation from both sides of the casings, subjecting the casings to a partial curing treatment sufficient to fix the built-in masses of rubber around and about their constituent strain resisting elements, subsequently collapsing the molds, and completely curing the casings under compacting pressure applied through the sections of the molds.

5. That method of curing tire casings in molds stacked in a press type of vulcanizer which includes, holding the sections of a plurality of the molds apart during a rubber setting treatment fixing the relative masses of rubber coating and separating their constituent cords or threads, and subsequently closing the molds and completely curing the casings while compacting their walls.

6. That method of manufacturing tire casings which includes, building the tires of strain resisting fibrous elements and vulcanizable rubber, introducing the casings in sectional molds, stacking a plurality of the casings in a press with the mold-sections spaced apart enough to relieve each tire of substantial confinement, partially curing the casings while unconfined, and completely curing the casings with the mold-sections clamped powerfully upon their walls.

7. That method of manufacturing tires which includes, forming tires of strain resisting elements and vulcanizable rubber, introducing the tires in sectional molds and collapsibly supporting their sections in spaced relation to entirely relieve the tires of metallic confinement, stacking a plurality of the molds whose sections are thus spaced apart in a heater, subjecting the substantially free tires in the stacked molds to vulcanizing treatment until their constituent strain resisting elements have been set in partially cured rubber, then closing the molds, and finally completely curing the tires under a substantial compacting pressure transmitted through the walls of the molds.

8. Apparatus for curing a plurality of tires in rigid sectional molds comprising in combination, means for temporarily holding the sections of each mold spaced apart to relieve the tires of substantial compacting pressure, means for subjecting the tires to vulcanizing treatment, and means for closing the sectional molds and applying substantial compacting pressure to the tires.

9. Apparatus for curing a plurality of tires in rigid sectional molds comprising in combination, collapsible means for temporarily holding the sections of each mold spaced apart to relieve the tires of substantial compacting pressure, means for subjecting the tires to vulcanizing treatment, and means operable at will for closing the sectional molds and applying substantial compacting pressure to the tires.

10. Apparatus for curing a plurality of tires in sectional molds comprising in combination, lead members for temporarily holding the sections of each mold spaced apart to relieve the tires of substantial compacting pressure, means for subjecting the tires to vulcanizing treatment, and means for closing the sectional molds and applying substantial compacting pressure to the tires.

11. Apparatus for curing a plurality of tires in rigid sectional molds comprising in combination, means for temporarily holding the sections of each mold spaced from contact with one or both sides of the tire, means for subjecting the tires to vulcanizing treatment, and means for closing the sectional molds in one operation and applying substantial compacting pressure to the tires therein.

12. The combination with a sectional rigid mold of collapsible devices for temporarily holding the sections apart, said devices being collapsible by pressure applied to the mold sections.

13. The combination with a stack of sectional tire molds and cores of means insertable therebetween for temporarily holding the sections of each mold spaced from its core to a pre-determined extent.

14. Apparatus for curing a plurality of tires on cores and in rigid sectional molds comprising in combination, means for temporarily holding the mold sections spaced apart a distance not less than the total thickness of the tire, a chamber for applying a heating medium to a plurality of molds stacked therein, and devices for closing the molds and applying pressure therethrough to the tires operable from without the heating chamber, whereby without removal from the heating chamber the strain resisting tire elements may be set initially in partially cured rubber before applying compacting pressure and completely curing them.

15. Apparatus for curing a plurality of tires on cores and in sectional molds comprising in combination, collapsible means for temporarily holding the mold sections spaced apart a distance not less than the total thickness of the tire, a chamber for applying a heating medium to the molds stacked therein, and devices operable from without the heating chamber for applying pressure to the molds and closing them at will, whereby the tires may be cured without removal from the heating chamber and with an opportunity to initially set their strain resisting elements in cushioning masses of partially vulcanized rubber before the cure is completed under compacting pressure.

16. Apparatus for curing a plurality of tires on cores and in sectional molds comprising in combination, lead pellets for temporarily holding the mold sections spaced apart a distance not less than the total thickness of the tire, a chamber for applying a heating medium to the molds stacked therein; and devices operable from without the heating chamber for applying pressure to the molds and closing them at will, whereby tires may be cured partially in the absence of substantial pressure and their cure completed under substantial pressure.

Signed at New York, N. Y., this 21st day of April, 1921.

ERNEST HOPKINSON.